(12) United States Patent
Ganesan

(10) Patent No.: US 7,314,507 B1
(45) Date of Patent: Jan. 1, 2008

(54) APPARATUS AND METHOD FOR REMOVING MERCURY VAPOR FROM A GAS STREAM

(75) Inventor: Kumar Ganesan, Butte, MT (US)

(73) Assignee: Montana Tech of The University of Montana, Butte, MT (US)

( * ) Notice: Subject to any disclaimer, the term of this patent is extended or adjusted under 35 U.S.C. 154(b) by 231 days.

(21) Appl. No.: 10/993,719

(22) Filed: Nov. 19, 2004

Related U.S. Application Data

(60) Provisional application No. 60/523,367, filed on Nov. 19, 2003.

(51) Int. Cl.
*B01D 53/34* (2006.01)

(52) U.S. Cl. .......................................... 95/134; 95/285

(58) Field of Classification Search ............... 95/8, 95/134, 148, 273, 274, 285; 55/525; 96/154; 110/203, 345
See application file for complete search history.

(56) References Cited

U.S. PATENT DOCUMENTS

| | | | | |
|---|---|---|---|---|
| 3,888,124 A | * | 6/1975 | Campbell et al. ........ 73/863.21 |
| 4,094,777 A | * | 6/1978 | Sugier et al. ................ 210/670 |
| 5,141,724 A | * | 8/1992 | Audeh et al. ................ 423/210 |
| 5,409,522 A | * | 4/1995 | Durham et al. ................ 75/670 |
| 5,419,884 A | * | 5/1995 | Weekman et al. .......... 423/210 |
| 6,136,072 A | * | 10/2000 | Sjostrom et al. .............. 95/134 |
| 2004/0045437 A1 | * | 3/2004 | Chang et al. ................. 95/134 |

FOREIGN PATENT DOCUMENTS

| AT | 402610 B | * | 5/1997 |
| EP | 405119 A | * | 1/1991 |
| JP | 58-074128 A | * | 5/1983 |

\* cited by examiner

*Primary Examiner*—Frank M. Lawrence
(74) *Attorney, Agent, or Firm*—Jean Kyle

(57) ABSTRACT

A metallic filter effectively removes mercury vapor from gas streams. The filter captures the mercury which then can be released and collected as product. The metallic filter is a copper mesh sponge plated with a six micrometer thickness of gold. The filter removes up to 90% of mercury vapor from a mercury contaminated gas stream.

11 Claims, 5 Drawing Sheets

APPARATUS AND METHOD FOR REMOVING MERCURY VAPOR FROM A GAS STREAM

CROSS-REFERENCE TO RELATED APPLICATIONS

This application claims the benefits of U.S. Provisional Patent Application No. 60/523,367, filed Nov. 19, 2003. The disclosure of this application is hereby incorporated by reference in its entirety, including all figures, tables, and drawings.

DESCRIPTION

The subject invention was made with government support under a research project supported by the Department of Energy, Grant No. DE-FC26-02NT41607. The government has certain rights in this invention.

BACKGROUND OF THE INVENTION

Coal contains relatively low levels of mercury ranging from 0.010 to 3.5 parts per million by weight. Mercury emissions from coal combustion in power plants however have received special attention since coal is burned in about 1700 power plants in the United States (U.S.). In 1999, 43 tons of mercury were emitted from U.S. coal fired power plants. Mercury is classified as a hazardous air pollutant under the Clean Air Act Amendments (CAAA) of Title III and is an air toxic. Air toxics are hazardous air pollutants which are known or suspected to cause cancer or other serious health effects such as birth defects or reproductive effects. In the 1998 Utility Air Toxics Report to the U.S. Congress the Environmental Protection Agency (EPA) indicated that mercury posed the greatest concern of all the toxics emitted from power plants.

In 2003, the EPA announced its intention to regulate power plant mercury emissions. Final regulations are expected in 2005, and compliance is projected for 2007. The new regulations could require up to a 90% reduction in mercury emission from power plants. This requirement will have significant financial implications for power plants. Therefore, developing cost effective control technologies to remove mercury from power plant emissions will become increasingly necessary.

Several control technologies are currently being studied. These technologies focus mainly on pre-combustion and post combustion processes. Pre-combustion processes involve coal-cleaning technologies to reduce mercury burden at the source. Post combustion processes involve adsorption of mercury vapor by carbon-base material and conversion of that vapor to an oxidized form for removal by a wet system or particulate filters. These technologies convert the mercury contaminant from a gas to a solid. Therefore, it is still necessary to dispose of the solid phase as hazardous waste.

It has been estimated that 90% of mercury emitted from burning western coal is in the form of mercury vapor (elemental). Eastern coal combustion generates 60% elemental mercury and another 40% mainly in the form of divalent mercury. Regulation of these mercury emissions is near and thus the development of effective technologies to control these emissions is critical.

All patents, patent applications, provisional patent applications and publications referred to or cited herein, are incorporated by reference in their entirety to the extent they are not inconsistent with the explicit teachings of the specification.

BRIEF SUMMARY OF THE INVENTION

The method of the subject invention removes mercury vapor from a gas stream. Mercury vapor can be present in coal fired flue gas, as well as gas streams released by the chloro-alkali industry. Contaminated gas streams are passed over a metallic filter which captures and removes the mercury from the gas stream. The captured mercury can then be released from the filter and recovered as product. Preferably, the metallic filter is in a form through which the gas stream passes maximizing gas stream/filter contact surface area. A disk filter, metallic beads and a mesh sponge are suitable forms of the metallic filter. The precious metals gold and silver are effective metallic filters for capturing mercury vapor. Other substrates can be plated or coated with these metals to reduce the cost of the subject filters.

DETAILED DESCRIPTION OF THE INVENTION

Mercury vapor is removed from a gas stream by passing the gas stream over a metallic filter. The mercury in the gas stream is captured by the metal of the filter. Advantageously, the captured mercury can be recovered from the filter as product.

The filters of the subject invention are preferably formed to maximize gas stream/filter contact surface area. Further, in the exemplified embodiments, the filters are configured to allow the gas stream to pass through the filter. This configuration is preferred for outlet streams such as in a coal flue to insure contact of the entire stream with the filter. It is apparent to those skilled in the art the configuration and size of filter necessary to effectively scrub a given gas stream. Various filter configurations were tested and are suitable for the subject method, these configurations, include but are not limited to, perforated disks, a plurality of beads and mesh sponges. Mesh sponges exert a low pressure drop on the gas stream while providing tremendous surface area for the mercury vapor to attach itself to the metal.

In a preferred embodiment, the metal filter is made of the precious metals gold or silver. To reduce cost of the subject filters however a substrate can be coated or plated with these metals to form the filters. For example, in a particularly preferred embodiment, a copper mesh sponge was plated with 6 micron layer of gold to construct the subject filter.

Captured mercury can be removed from the metallic filters as product. This allows the filters to be regenerated and reused. It is apparent to those skilled in the art how to recover the mercury from the metallic filters. For example, one method includes, but is not limited to, recovering the mercury by thermal condensation. As much as 99% of captured mercury was recovered by heating spent filters to less than 200° F. Reuse of the filters further contributes to the cost advantages of the method of the subject invention.

The following examples are offered to further illustrate but not limit both the compositions and the methods of the present invention. All percentages are by weight and all solvent mixture proportions are by volume unless otherwise noted.

Example 1

Removal of Mercury Vapor from a Gas Stream with Metallic Disks and Threads

Four gold filters were made of thin solid gold plate 2.5 centimeters in diameter. Pinholes of less than one millimeter diameter were made through the plates. In addition, gold threads of less than one millimeter diameter were made in 30 centimeter lengths. The threads were bundled to create the filter. These filters and threads were also made in silver. Since silver is less expensive silver filters were tested in parallel with gold filters to evaluate their effectiveness in removing mercury. Initial tests were performed at room temperature.

Figure 2:
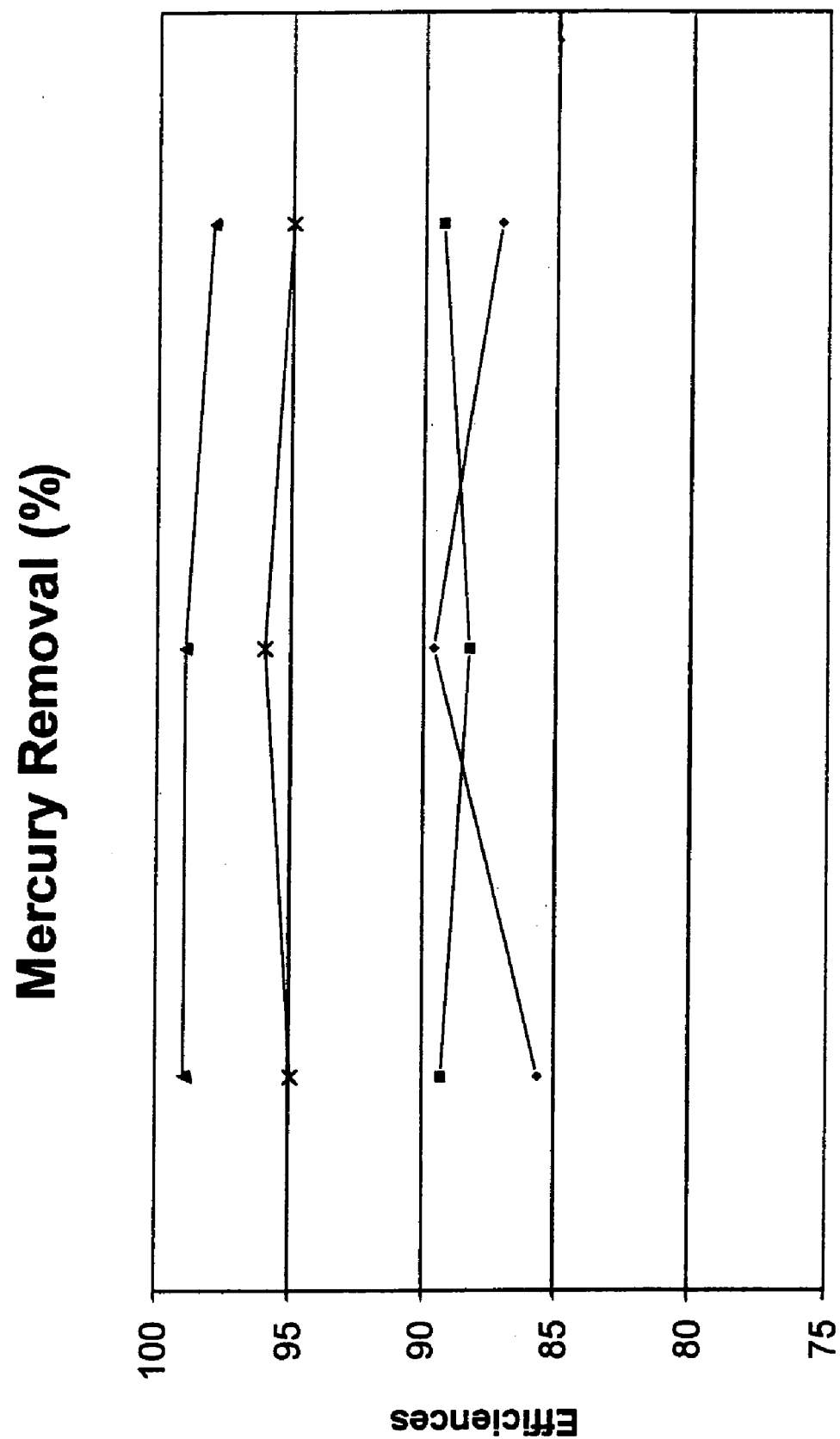
FIG. 2 is a graph showing the comparative efficiency of various metallic filters in removing mercury vapor from a gas stream where ♦ is silver wire and filter, ■ is gold wire, ▲ is silver plated beads and X is gold plated beads.

Filter efficiency testing was done using a mercury vapor analyzer, mercury tracker, which measures mercury to a low level of 0.1 µg/m³. This portable mercury analyzer measures mercury in the inlet and outlet of the gas stream of the filter from which the efficiency of the filter is determined (FIG. 2).

TABLE 1

Silver Wire at 5 (liters per minute) lpm flow
Hg Vapor µg/m³

| Inlet | Outlet | % Removal |
|---|---|---|
| 34.4 | 12.7 | 63.1 |
| 66.8 | 18.8 | 71.9 |
| 75 | 19.5 | 74.0 |
| 117.2 | 132 | 88.7 |

TABLE 2

Silver Wire* and Filter** at 5 lpm flow
Hg Vapor µg/m³

| Inlet | Outlet | % Removal |
|---|---|---|
| 215 | 47 | 78.1 |
| 198 | 43 | 78.3 |
| 192 | 45 | 76.6 |

*Weight of silver used: wire - 8.35 g
**Filters - 3.05 g

TABLE 3

Silver Wire* and Filter** at 3 lpm flow
Hg Vapor µg/m³

| Inlet | Outlet | % Removal |
|---|---|---|
| 252 | 36 | 85.7 |
| 263 | 27 | 89.7 |
| 263 | 34 | 87.1 |

*Weight of silver used: wire - 8.35 g
**Filter: 5.05 g

TABLE 4

Silver Wire* at 3 lpm flow
Hg Vapor µg/m³

| Inlet | Outlet | % Removal |
|---|---|---|
| 353 | 38 | 89.3 |
| 360 | 42 | 88.3 |
| 298 | 32 | 89.3 |

*Amount of gold in wire - 8.05 g
**Filter - 7.28 g

TABLE 5

Silver Wire and Filter** at 5 lpm flow
Hg Vapor µg/m³

| Inlet | Outlet | % Removal |
|---|---|---|
| 196 | 55 | 71.9 |
| 184 | 54 | 70.7 |
| 186 | 52 | 72.0 |

*Amount of gold in wire - 8.05 g
**Amount of gold in filter - 7.28 g

Example 2

Removal of Mercury Vapor from a Gas Stream with Silver Plated Beads

Figure 1:
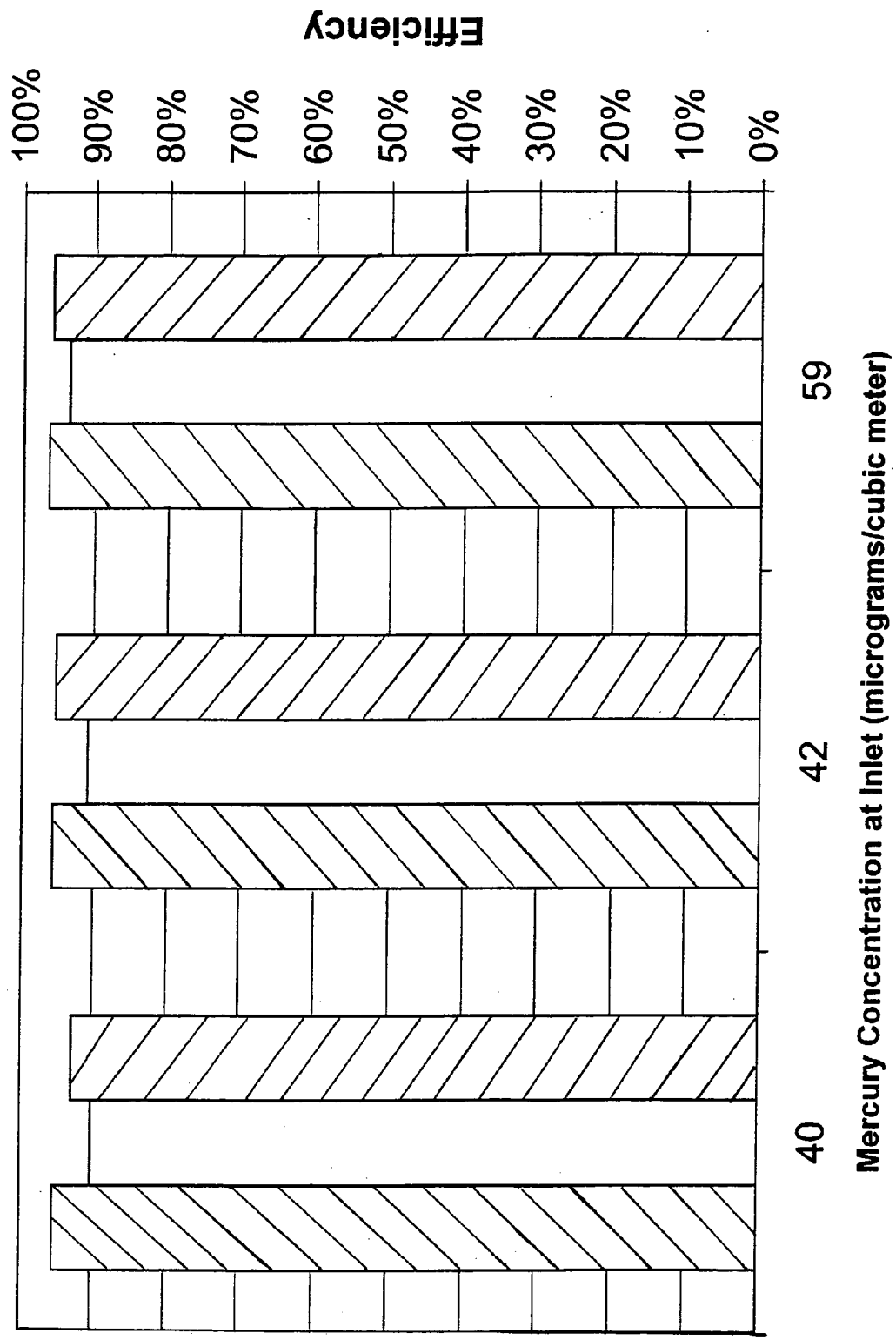
FIG. 1 is a graph showing the efficiency of mercury removal from a gas stream using silver plated beads where ■ is 133° F., □ is 163° F. and ▨ is 70° F.

Commercially available silver plated beads (approximately 3 mm in diameter) were tested for their efficiency of removing mercury from a gas stream at 5 lpm (FIG. 1).

TABLE 6

Silver Plated Beads at 56 C.°

| Inlet | Outlet | % Removal |
|---|---|---|
| 53.8 | 32.3 | 96 |
| 42.8 | 2.1 | 95 |
| 41 | 3 | 93 |

TABLE 7

Silver Beads at 73 degrees C.°

| Inlet | Outlet | % Removal |
|---|---|---|
| 44.3 | 2.9 | 93 |
| 39 | 3.6 | 91 |
| 36.1 | 90 | 90 |

Example 3

Removal of Mercury Vapor from a Gas Stream with a Gold Plated Sponge

Copper sponges were coated with gold using an electro-deposition process. Copper sponges were immersed in a gold cyanide solution and a DC current was passed through the solution. Gold ions migrate toward the copper sponge and are deposited on the sponge's surface. The thickness of the gold plating is controlled by the amount of time the electro-deposition process is continued. It was found that a gold plate thickness of six micrometers works well for the filters in the subject method. As is apparent to those skilled in the art, gold plating thickness and the amount of surface area to be plated determine the amount of gold cyanide solution required for proper plating.

The filters were packed into a 2.5 cm diameter and 15 cm long plastic tube and were about 18 g with about 50 cm² per gram of surface area. Therefore, there was about 950 cm² total surface area available for mercury removal. A flow rate of 5 lpm was maintained to provide a residence time of 0.3 seconds and was calculated based on this residue time.

It was assumed that filter efficiency follows a simple first order equation:

$$n=1-e^{-A/Am}$$

Where n=removal efficiency, A=available surface area and Am=surface area for one mass transfer unit. This simple equation can be used initially to evaluate the engineering design of mercury filters.

A mercury vapor source was connected to a pump to draw about 5 lpm air containing mercury vapor. The mercury vapor generator has an elemental mercury vessel with an airflow controller to control the airflow and thus to produce the required inlet mercury concentrations for evaluating the filters. The mercury vapor was passed through the filter and the mercury vapor concentration levels at the inlet and outlet were measured to evaluate the filter efficiency. Concentration levels both at the inlet as well as at the outlet were measured by a Mercury Tracker. This mercury analyzer has the sensitivity to measure mercury concentrations of 0.01 $\mu g/m^3$. Testing continued until mercury removal efficiency of the filter dropped to 50%. The entire experimental setup was under the fume hood. Three test were conducted with three different gold filters.

Figure 3:
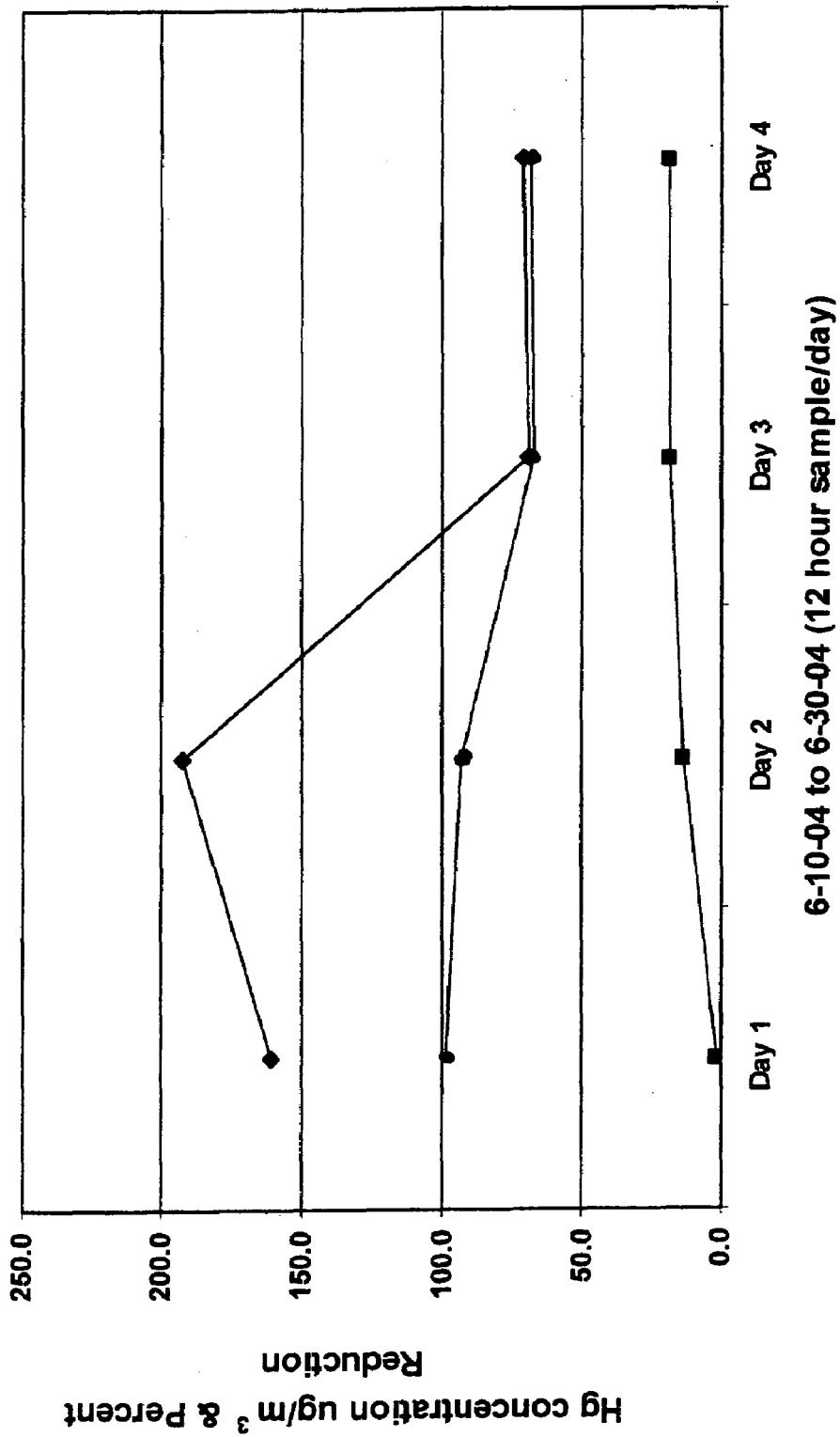
FIG. 3 is a graph showing the efficiency of mercury removal from a stack gas stream of a coal fired power plant where ♦ is inlet $\mu g/m^3$, ■ is outlet $\mu g/m^3$ and ● is % reduction.

During the first test the average inlet mercury concentration level ranged from 60 to 180 $\mu g/m^3$ and most of the test period the concentration was about 100 $\mu g/m^3$ (FIG. 3). The results showed 90% removal efficiency for about 30 hours.

Figure 4:
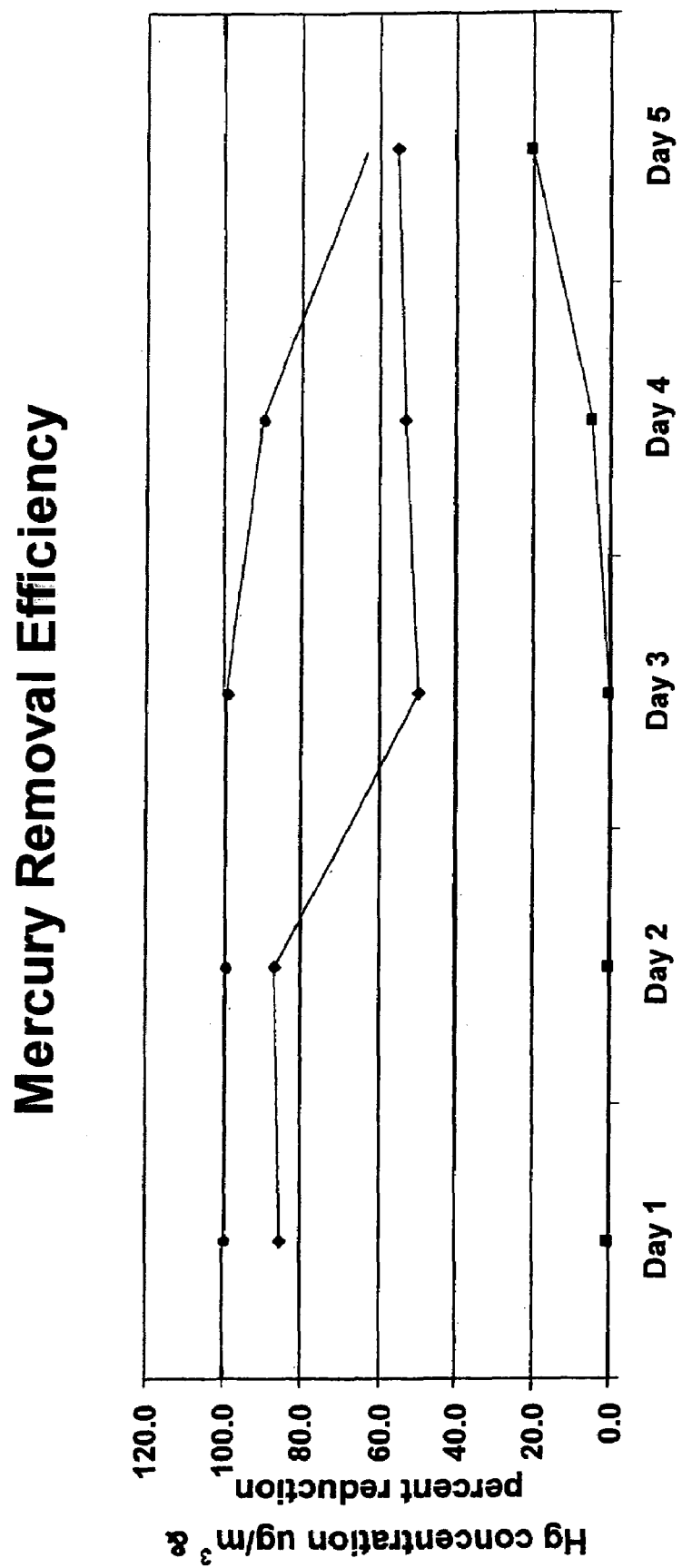
FIG. 4 is a graph showing the efficiency of mercury removal from a stack gas stream of a coal fired power plant where ♦ is inlet $\mu g/m^3$, ■ is outlet $\mu g/m^3$ and ● is % reduction.
Figure 5:
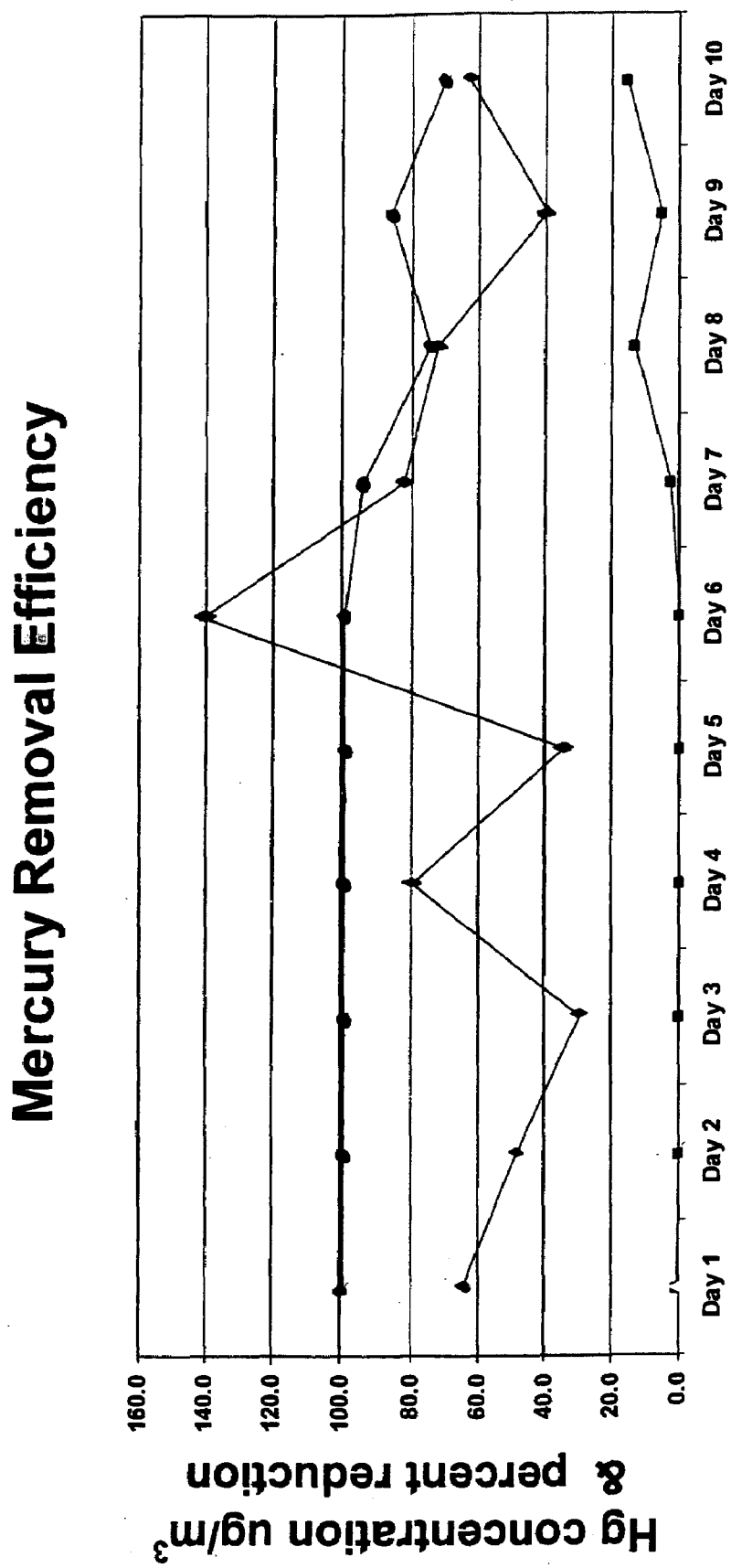
FIG. 5 is a graph showing the efficiency of mercury removal from a stack gas stream of a coal fired power plant where ♦ is inlet $\mu g/m^3$, ■ is outlet $\mu g/m^3$ and ● is % reduction.

During the second test (FIG. 4) the average inlet mercury concentration level ranged from 80 to 150 $\mu g/m^3$. In the second test the 90% removal efficiency lasted for about 42 hours. With the third filter (FIG. 5) the 90% efficiency lasted for about 84 hours where the concentration level ranged between 30 to 140 $\mu g/m^3$ for most of the testing period. The laboratory test results indicated that the removal efficiency with the filters lasted longer with lower inlet mercury concentrations.

Example 4

Removal of Mercury Vapor from a Stack Gas Stream of a Coal Fired Power Plant Metallic filters prepared as in Example 3 were tested in the stack gas stream of a coal fired power plant. A small amount of stack gas was diverted through the metallic filter to measure its effectiveness in removing mercury. Two different instruments, the Mercury Ultra Tracer UT-3000, which measures total gaseous mercury in an air stream at ultra trace levels ($ng/m^3$) and a portable analyzer, Mercury Tracker 3000, that measures mercury levels in air streams as low as 0.01 $\mu g/m^3$, were used. The inlet mercury concentration levels fluctuated in the coal fired power plant flue gas. The Mercury Tracker results show more than 97% mercury removal efficiency from the flue gas, where the Mercury Ultra Tracer results show 85 to 98% efficiency. High relative humidity in the coal fired power plant flue gas stream did not allow the testing to continue longer than 12 hours per day. Water condensation occurred quickly. The sample line should perhaps be treated to avoid water condensation.

It is understood that the foregoing examples are merely illustrative of the present invention. Certain modifications of the articles and/or methods employed may be made and still achieve the objectives of the invention. Such modifications are contemplated as within the scope of the claimed invention.

The invention claimed is:

1. A method for removing mercury vapor from a gas stream, the method comprising the steps of:
   passing the gas stream over a copper sponge coated by electro-deposition with gold plate.

2. The method of claim 1, wherein said gold plate is about 6 micrometers thick.

3. The method of claim 1, wherein the method further comprises the step of, after passing said gas stream over said metallic filter:
   measuring a final concentration of mercury vapor in said gas stream.

4. The method of claim 3, further comprising the step of, before passing said gas stream over said metallic filter:
   measuring an initial concentration of mercury vapor in said gas stream.

5. The method of claim 3, further comprising the step of:
   repeating the steps of passing said gas stream over said metallic filter and measuring a final concentration of mercury vapor in said gas stream, if said final concentration of mercury vapor is not less than about 0.01 parts per million.

6. The method of claim 4, further comprising the step of:
   repeating the steps of passing said gas stream over said metallic filter and measuring a final concentration of mercury vapor in said gas stream, if said final concentration of mercury vapor is not less than about 0.01 parts per million.

7. The method of claim 1, further comprising the step of recovering said mercury from said metallic filter.

8. A method of removing mercury vapor from a gas stream, the method comprising the steps of:
   a. measuring an initial concentration of mercury vapor in the gas stream;
   b. passing the gas stream over a copper sponge coated by electro-deposition with gold plate; and
   c. measuring a final concentration of mercury vapor in the gas stream.

9. The method of claim 8, further comprising the step of:
   d. repeating steps b and c, if the final concentration of mercury vapor is not less than 0.01 parts per million.

10. The method of claim 8, further comprising the step of recovering said mercury from said metallic filter.

11. The method of claim 8, wherein said gold plate has a thickness of about 6 micrometers.

* * * * *